(12) United States Patent
Davis

(10) Patent No.: US 7,725,270 B2
(45) Date of Patent: May 25, 2010

(54) INDUSTRIAL FLOW METER HAVING AN ACCESSIBLE DIGITAL INTERFACE

(75) Inventor: Michael A. Davis, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 0 days.

(21) Appl. No.: 11/373,038

(22) Filed: Mar. 10, 2006

(65) Prior Publication Data

US 2006/0201430 A1   Sep. 14, 2006

Related U.S. Application Data

(60) Provisional application No. 60/660,705, filed on Mar. 10, 2005.

(51) Int. Cl.
*G01F 1/00* (2006.01)
(52) U.S. Cl. ...................... 702/45; 73/861.02
(58) Field of Classification Search .................. 702/45, 702/47–48, 50, 54, 138; 73/861.02, 861.18, 73/861.22, 861.23, 861.355, 861.356, 861.357
See application file for complete search history.

(56) References Cited

U.S. PATENT DOCUMENTS

| | | | | |
|---|---|---|---|---|
| 5,504,693 | A * | 4/1996 | Elliott et al. ................. | 700/282 |
| 5,535,632 | A * | 7/1996 | Kolpak ..................... | 73/861.04 |
| 5,633,809 | A * | 5/1997 | Wissenbach et al. ......... | 702/45 |
| 5,723,783 | A * | 3/1998 | Woodward .................. | 73/203 |
| 6,354,147 | B1 | 3/2002 | Gysling et al. | |
| 6,435,030 | B1 | 8/2002 | Gysling et al. | |
| 6,450,037 | B1 | 9/2002 | McGuinn et al. | |
| 6,463,813 | B1 | 10/2002 | Gysling et al. | |
| 6,536,291 | B1 | 3/2003 | Gysling et al. | |
| 6,587,798 | B2 | 7/2003 | Kersey et al. | |
| 6,601,458 | B1 | 8/2003 | Gysling et al. | |
| 6,609,069 | B2 | 8/2003 | Gysling et al. | |
| 6,691,584 | B2 | 2/2004 | Gysling et al. | |
| 6,732,575 | B2 | 5/2004 | Gysling et al. | |
| 6,782,150 | B2 | 8/2004 | Davis et al. | |
| 6,810,308 | B2 * | 10/2004 | Shajii et al. ................. | 700/282 |
| 6,813,962 | B2 | 11/2004 | Gysling et al. | |
| 6,817,982 | B2 * | 11/2004 | Fritz et al. ................... | 600/443 |
| 6,837,098 | B2 | 1/2005 | Gysling et al. | |
| 6,850,849 | B1 * | 2/2005 | Roys .......................... | 702/45 |
| 6,862,920 | B2 | 3/2005 | Gysling et al. | |
| 6,868,737 | B2 | 3/2005 | Croteau et al. | |
| 6,889,562 | B2 | 5/2005 | Gysling et al. | |
| 6,898,541 | B2 | 5/2005 | Gysling et al. | |
| 6,959,604 | B2 | 11/2005 | Bryant et al. | |
| 6,971,259 | B2 | 12/2005 | Gysling et al. | |

(Continued)

FOREIGN PATENT DOCUMENTS

WO     2004010086     1/2004

*Primary Examiner*—Hal D Wachsman
*Assistant Examiner*—Mary C Baran

(57) ABSTRACT

An apparatus for measuring a parameter of a fluid flowing within a pipe includes a sensing device having a sensor for sensing an unsteady pressure of the fluid flow. The sensing device generates sensor data responsive to the parameter. A processing device, which communicates with the sensing device, receives and processes the sensor data to generate meter data. The apparatus includes a digital interface, which communicates with the processing device, that is configured to associate with a portable external digital storage device for transferring information between the apparatus and the portable external digital storage device.

11 Claims, 13 Drawing Sheets

U.S. PATENT DOCUMENTS

| | | |
|---|---|---|
| 6,988,411 B2 | 1/2006 | Gysling et al. |
| 7,004,191 B2 * | 2/2006 | Shajii et al. ............... 137/487.5 |
| 7,032,432 B2 | 4/2006 | Gysling et al. |
| 7,062,976 B2 | 6/2006 | Gysling et al. |
| 7,086,278 B2 | 8/2006 | Gysling et al. |
| 7,093,500 B2 * | 8/2006 | Schulz et al. ............ 73/861.15 |
| 7,111,603 B1 | 9/2006 | Davis et al. |
| 7,121,152 B2 | 10/2006 | Winston et al. |
| 7,127,360 B2 | 10/2006 | Gysling et al. |
| 7,130,750 B1 * | 10/2006 | Stevens et al. ................. 702/64 |
| 7,134,320 B2 | 11/2006 | Gysling et al. |
| 7,139,667 B2 | 11/2006 | Rothman et al. |
| 7,146,864 B2 | 12/2006 | Sullivan et al. |
| 7,152,460 B2 | 12/2006 | Gysling et al. |
| 7,181,955 B2 | 2/2007 | Gysling |
| 7,237,440 B2 | 7/2007 | Gysling |
| 2003/0136186 A1 | 7/2003 | Gysling |
| 2003/0154036 A1 | 8/2003 | Gysling et al. |
| 2004/0069069 A1 | 4/2004 | Gysling et al. |
| 2004/0128084 A1 | 7/2004 | Keech |
| 2004/0162284 A1 | 8/2004 | Harris |
| 2004/0168522 A1 | 9/2004 | Fernald et al. |
| 2004/0199340 A1 | 10/2004 | Kersey et al. |
| 2004/0210404 A1 | 10/2004 | Gysling et al. |
| 2004/0231431 A1 | 11/2004 | Sullivan |
| 2004/0255695 A1 | 12/2004 | Gysling et al. |
| 2005/0005711 A1 | 1/2005 | Gysling et al. |
| 2005/0005712 A1 | 1/2005 | Gysling et al. |
| 2005/0011258 A1 | 1/2005 | Gysling et al. |
| 2005/0011283 A1 | 1/2005 | Gysling et al. |
| 2005/0039520 A1 | 2/2005 | Davis et al. |
| 2005/0125169 A1 | 6/2005 | Loose |
| 2005/0159904 A1 | 7/2005 | Loose et al. |
| 2005/0246111 A1 | 11/2005 | Gysling et al. |
| 2006/0037385 A1 | 2/2006 | Gysling |
| 2006/0048583 A1 | 3/2006 | Gysling |
| 2007/0005272 A1 | 1/2007 | Gysling |

* cited by examiner

INDUSTRIAL FLOW METER HAVING AN ACCESSIBLE DIGITAL INTERFACE

CROSS-REFERENCE TO RELATED PATENT APPLICATIONS

The present application claims the benefit of U.S. Provisional Patent Application No. 60/660,705 filed Mar. 10, 2005, which is incorporated by reference herein in its entirety.

TECHNICAL FIELD

This invention relates generally to an apparatus for measuring a parameter of a process flow passing within a pipe, and more particularly to a flow measurement apparatus having an accessible memory interface for easily adding functionality to the apparatus, changing the functionality of the apparatus and performing a variety of diagnostic, meter configuration upgrades and data accumulation tasks.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of fluids in an industrial flow process. Such physical parameters may include, for example, volumetric flow rate, composition, gas volume fraction, consistency, density, and mass flow rate.

One such sensing technology is described in commonly-owned U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, where the k-ω plot is indicative of a dispersion relation for the propagation of acoustic pressures emanating from the vortical disturbances. The method also includes the steps of: identifying a convective ridge in the k-ω plot; determining the orientation of the convective ridge in the k-ω plot; and determining the flow velocity based on a predetermined correlation of the flow velocity with the slope of the convective ridge of the k-ω plot.

Another such sensing technology is described in commonly-owned U.S. Pat. Nos. 6,354,147 and 6,732,575 to Gysling et al, both of which are incorporated by reference herein in their entirety. The '147 and '575 patents describe a spatial array of acoustic pressure sensors placed at predetermined axial locations along a pipe. The pressure sensors provide acoustic pressure signals to signal processing logic which determines the speed of sound of the fluid (or mixture) in the pipe using any of a number of acoustic spatial array signal processing techniques with the direction of propagation of the acoustic signals along the longitudinal axis of the pipe. The speed of sound is provided to logic, which calculates the percent composition of the mixture, e.g., water fraction, or any other parameter of the mixture, or fluid, that is related to the sound speed. The logic may also determine the Mach number of the fluid. Such sensing technologies are effective in determining various parameters of a fluid flow within a pipe. However, as with any computationally complex process, there remains a need to increase computational efficiency and accuracy.

Unfortunately however, in most industrial plants the infrastructure required to obtain this information from installed meters is limited. For example, most infrastructures typically only provide an analog interface of 4-20 mA. This is inadequate for carrying the desired information due to an insufficient amount of bandwidth in its standard analog mode. Moreover, even with superimposed digital communications this analog interface is unable to provide the bandwidth required to transfer a sufficient amount of information for desired purposes.

Thus, the ability to obtain/upload information from/to a meter, including software upgrades/changes, commonly measured parameters, meter health information and any additional information that may pertain to the quality of the commonly measured parameters and/or functionality of the meter would be helpful. This is desirable because any information regarding the fluid and health/performance of the meter may aid in diagnosing and optimizing the meter performance. As such, a collection of this information from monitoring stations disposed in multiple locations around an industrial plant promises the potential for developing a better understanding and thus a more efficient control process. Additionally, this collection of information could better provide the ability to troubleshoot existing conditions and/or predict potential future problems. Moreover, the ability to reconfigure existing meters would allow meters to be tailored for a specific task as desired without the need to change the entire meter.

SUMMARY OF THE INVENTION

An apparatus for measuring a parameter of a fluid flowing within a pipe is provided, wherein the apparatus includes a sensing device having a sensor for sensing a characteristic of the fluid flow, wherein the sensing device generates sensor data responsive to the characteristic. A processing device is also included wherein the processing device is communicated with the sensing device, wherein the processing device receives and processes the sensor data to generate meter data indicative of the fluid. Additionally, at least one digital interface is provided, wherein at least one digital interface is communicated with the processing device and wherein the at least one digital interface is configured to associate with a portable external digital storage device for transferring information between the apparatus and the external digital storage device.

A processing unit for an apparatus having a sensor for measuring a parameter of a fluid flowing within a pipe is provided, wherein the processing unit includes a processing device communicated with the sensor, wherein the processing device receives and processes sensor data from the sensor to generate meter data and at least one digital interface communicated with the processing device, the at least one digital interface configured for interfacing with a portable external digital storage device for transferring information between the processing unit and the external digital storage device.

A method for implementing a processing unit for an apparatus having a sensor for measuring a parameter of a fluid flowing within a pipe is provided, wherein the processing unit includes a processing device and at least one digital interface, wherein The processing device is communicated with the sensor to receive and process sensor data from the sensor to generate meter data and wherein the at least one digital interface is communicated with the processing device and configured for interfacing with an external digital storage device for transferring information between the processing unit and said external digital storage device. The method includes associating the external digital storage device with the processing unit and transferring The information between the external digital device and the processing unit via the digital interface.

BRIEF DESCRIPTION OF THE DRAWINGS

Referring now to the drawing wherein like items are numbered alike in the various Figures.

DETAILED DESCRIPTION

As described in U.S. Pat. No. 6,354,147, filed on Jun. 25, 1999, U.S. Pat. No. 6,691,584, filed on Jul. 2, 1999, U.S. Pat. No. 6,587,798, filed on Nov. 28, 2001, U.S. Pat. No. 6,609,069, filed on Dec. 4, 2000, U.S. patent application Ser. No. 10/349,716, filed on Jan. 23, 2003, and U.S. patent application Ser. No. 10/376,427, filed on Feb. 26, 2003, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
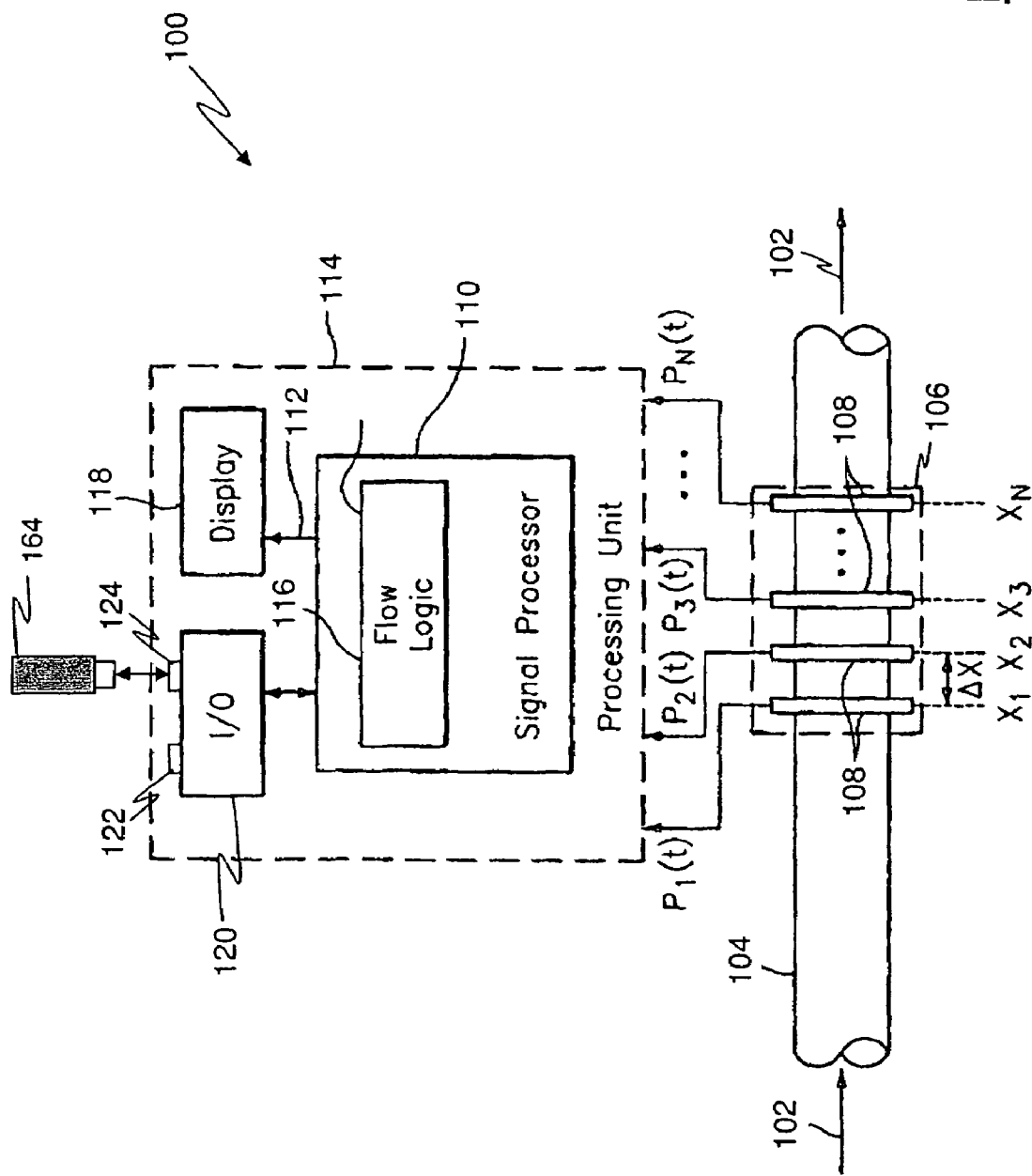
FIG. 1 is schematic diagram of an apparatus for determining at least one parameter associated with a fluid flowing in a pipe interfacing with an external digital storage device in accordance with various embodiments of the present invention.

Referring to FIG. 1, an apparatus 100 for measuring at least one parameter associated with a fluid 102 flowing within a pipe 104 is shown. The parameter of the fluid may include, for example, at least one of: velocity of the fluid 102, speed of sound in the fluid 102, density of the fluid 102, volumetric flow rate of the fluid 102, mass flow rate of the fluid 102, composition of the fluid 102, entrained air in the fluid 102, consistency of the fluid 102, and size of particles in the fluid 102. The fluid 102 may be a single or multiphase fluid 102 flowing through a duct, conduit or other form of pipe 104.

The apparatus 100 includes a spatial array 106 of at least two pressure sensors 108 disposed at different axial locations $x_1 \ldots x_N$ along the pipe 104. Each of the pressure sensors 108 provides a pressure signal P(t) indicative of unsteady pressure within the pipe 104 at a corresponding axial location $x_1 \ldots x_N$ of the pipe 104. A signal processor 110 receives the pressure signals $P_1(t) \ldots P_N(t)$ from the pressure sensors 108 in the array 106, determines the parameter of the fluid 102 using pressure signals from selected ones of the pressure sensors 108, and outputs the parameter as a signal 112. The signal processor 110 applies array-processing techniques to the pressure signals $P_1(t) \ldots P_N(t)$ to determine the velocity, speed of sound of the fluid 102, and/or other parameters of the fluid 102. More specifically, the signal processor 110 constructs from the signals at least a portion of a k-ω plot. The signal processor 110 then identifies a ridge in the k-ω plot. The slope of the ridge is assumed to be the fluid 102 velocity or sound velocity or correlated to the fluid 102 velocity or sound velocity in a known way. Thus, using the slope of the ridge, the parameters of the fluid 102 can be determined, as will be described in greater detail hereinafter.

While the apparatus 100 is shown as including four pressure sensors 108, it is contemplated that the array 106 of pressure sensors 108 includes two or more pressure sensors 108, each providing a pressure signal P(t) indicative of unsteady pressure within the pipe 104 at a corresponding axial location X of the pipe 104. For example, the apparatus may include 2, 3, 4, 5, 6, 7, 8, 9, 10, 11, 12, 13, 14, 15, 16, 17, 18, 19, 20, 21, 22, 23, or 24 pressure sensors 108. Generally, the accuracy of the measurement improves as the number of sensors 108 in the array 106 increases. The degree of accuracy provided by the greater number of sensors 108 is offset by the increase in complexity and time for computing the desired output parameter of the flow. Therefore, the number of sensors 108 used is dependent at least on the degree of accuracy desired and the desire update rate of the output parameter provided by the apparatus 100.

The signals $P_1(t) \ldots P_N(t)$ provided by the pressure sensors 108 in the array 106 are processed by the signal processor 110, which may be part of a larger processing unit 114. For example, the signal processor 110 may be a microprocessor and the processing unit 114 may be a personal computer or other general purpose computer. It is contemplated that the signal processor 110 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 112 of the flow process, the signal processor 110 applies the data from the selected pressure sensors 108 to flow logic 116 executed by signal processor 110. The flow logic 116 is described in further detail hereinafter.

The signal processor 110 may output the one or more parameters 112 to a display 118 or another input/output (1/0) device 120. The I/O device 120 also accepts user input parameters as may be necessary for the flow logic 116. The I/O device 120 includes an analog interface 122, such as a 4-20 mA interface, and at least one digital interface 124, wherein the digital interface 124 maybe a commonly known digital interface type configured to support a variety of external digital storage devices 164, such as a Universal Serial Bus (USB) Flash Drive, a Compact Flash card, a Smart Media card, a Secure Digital card and/or a Multimedia card. The I/O device 120 allows a user to store sensor/meter values, interrogate sensor/apparatus parameters and/or setup the apparatus 100 for process optimization. Additionally, the I/O device 120 allows for the ability to change functionality of the apparatus 100, add functionality to the apparatus 100, customize functionality of the apparatus 100 as well as just update the software version to fix address any software problems. Additionally, as discussed in more detail hereinafter, the digital interface 124 allows for a simple, easily accessible data port which permits for the easy and efficient upload/download of data/scripts between an external digital storage device 164 (such as a USB memory stick) and the apparatus 100 to perform a variety of diagnostic, upgrade and data accumulation tasks that are not possible with prior art configurations.

This capability advantageously allows for a user (such as a customer, trained distributor and field technician) to easily access/reconfigure an apparatus 100 located in a remote location, save data over a period of time and download information periodically without having to carry and set up bulky, fragile, costly and sophisticated computer equipment. Moreover, the information may be downloaded/uploaded from/to the external digital storage device via an internet connection to allow for an easy interface capability with the manufacturer and/or a maintenance team. The I/O device 120, display 118, and signal processor 110 unit may be mounted in a common housing, which may be attached to the array 106 by a flexible cable, wireless connection, or the like. The flexible cable may also be used to provide operating power from the processing unit 114 to the array 106 if necessary.

Figure 2:
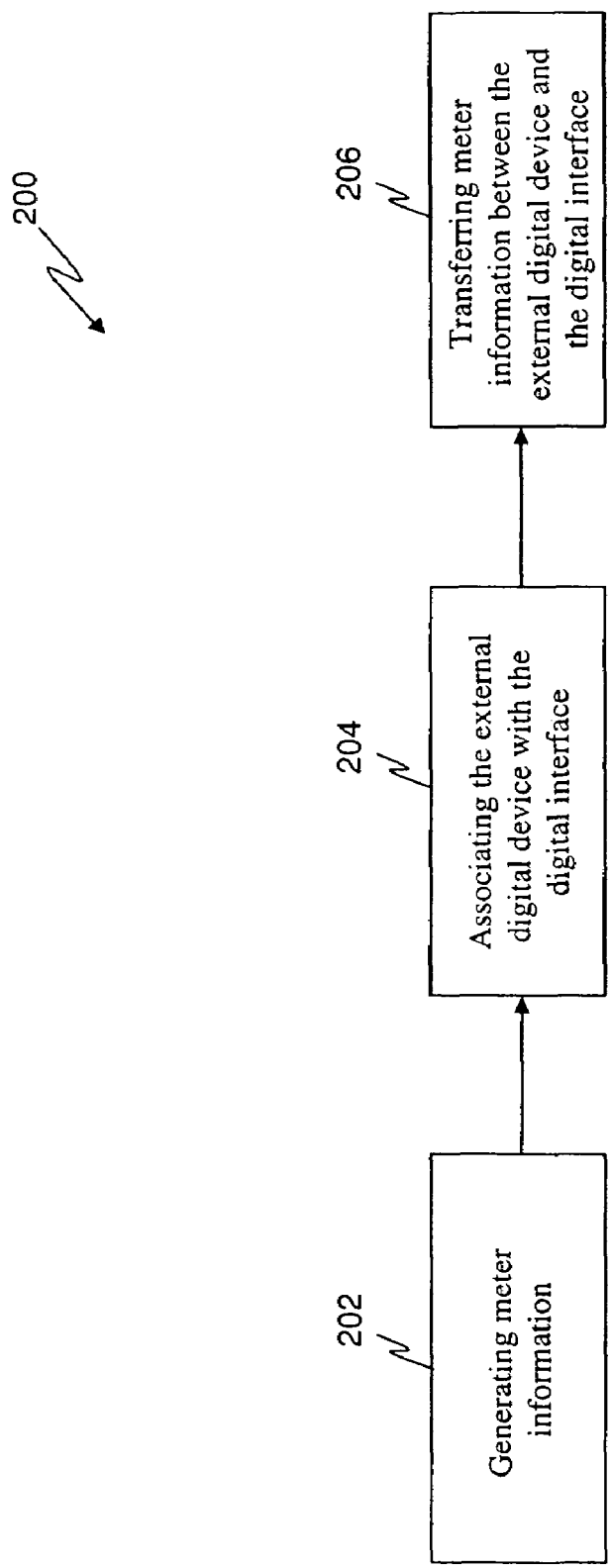
FIG. 2 is a block diagram illustrating a method for implementing the apparatus of FIG. 1.

By way of example, the use of the digital interface 124 to allow for easy and unfettered access to the apparatus 100 is discussed further below. Referring to FIG. 1 and FIG. 2, the apparatus 100 is shown interfacing with an external digital storage device 164 (in this case, a USB memory stick) and a method 200 for accessing the apparatus 100 using the USB memory stick 164 is provided. The method 200 includes generating sensor data and meter information using the apparatus 100, as shown in operational block 202. This may be accomplished by generating the sensor data and communicating the sensor data to the processing unit 114, which receives the sensor data and generates meter information. The USB memory stick 164 may then be associated with the digital interface 124, as shown in operational block 204, by inserting the USB memory stick 124 into the digital interface 124 of the I/O device 120. Sensor data and/or meter information may then be transferred between the USB memory stick 164 and the apparatus 100, as shown in operational block 206. It should be appreciated that the meter information may include raw sensor data directly from each of the sensors 108, raw sensor data directly from a selected sensor 108, processed data, programs/scripts for upload/download to the apparatus 100, configuration data for the apparatus 100 and/or functional/troubleshooting data for the apparatus (i.e. parametric data, diagnostic data, functional scripts and meter control information).

Figure 3:
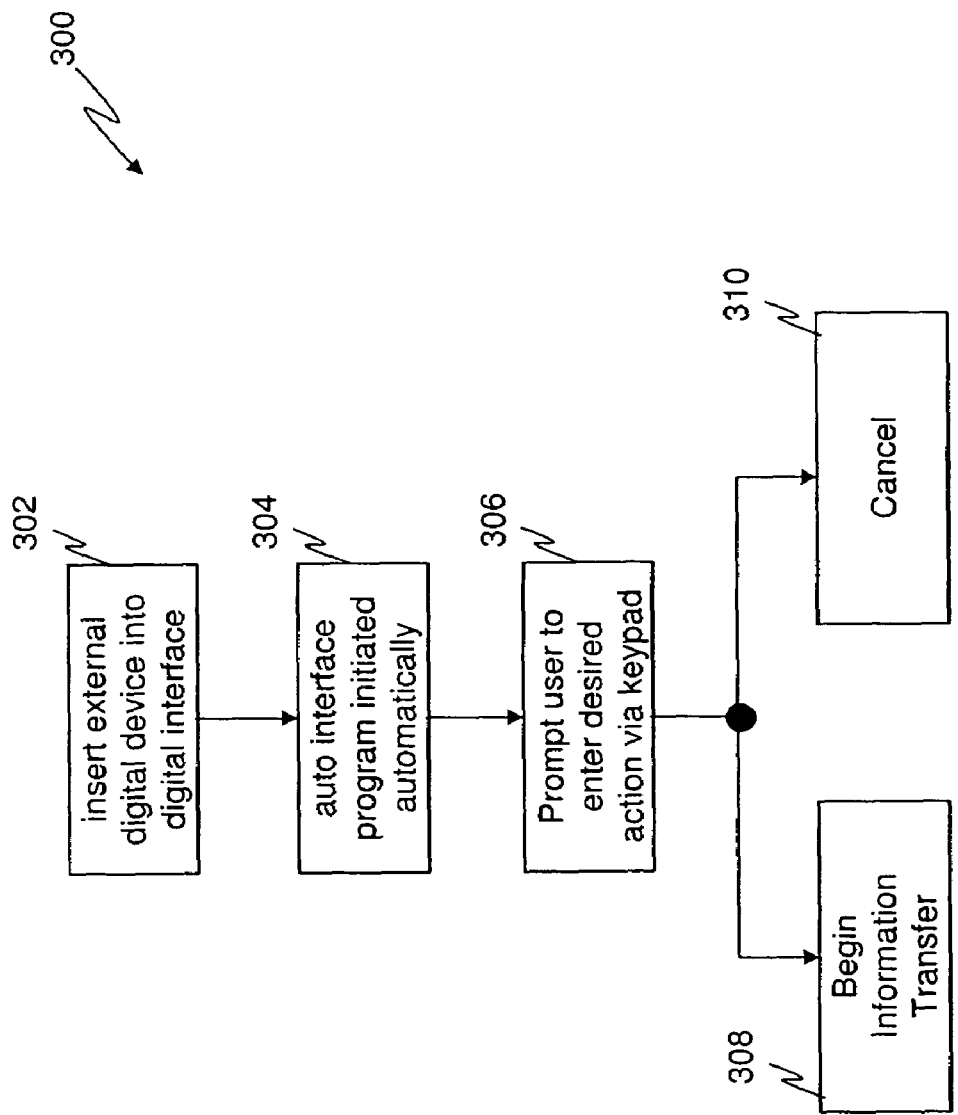
FIG. 3 is a block diagram illustrating one flow for an automatic interface program for the apparatus of FIG. 1.

At least one of the apparatus 100 and the USB memory stick 164 may be configured such that the transfer of information between the apparatus 100 and the USB memory stick 164 may occur either automatically upon insertion of the USB memory stick 164 into the digital interface 124 of the I/O device 120 or via a command from the user which causes the apparatus 100 to display a functional menu to the user via the display device 118. This is particularly advantageous in that this enables a user to upload software to the apparatus to add functionality, limit functionality and/or change functionality of the apparatus altogether. Additionally, this enables a user to completely change and/or modify apparatus software or add software to correct bugs within the existing software. Typically, there may be two download/upload situations that occur with the USB memory stick 164. The first situation involves an upload/download script that is automatically activated upon insertion of the USB memory stick 164 into the digital interface 124. Referring to FIG. 3, a block diagram 300 illustrating this situation is shown. Upon insertion of the USB memory stick 164 into the digital interface 124, as shown in block 302, an automatic script is initiated to begin the upload/download process between the USB memory stick 164 and the apparatus 100, as shown in block 304. As shown in block 306, the user is prompted via the display device 118 to either begin the upload/download process by pressing an 'enter' key on the display device 118 or cancel the upload/download process by pressing a 'cancel' key on the display device 118, as shown in blocks 308 and 310, respectively.

Figure 4:
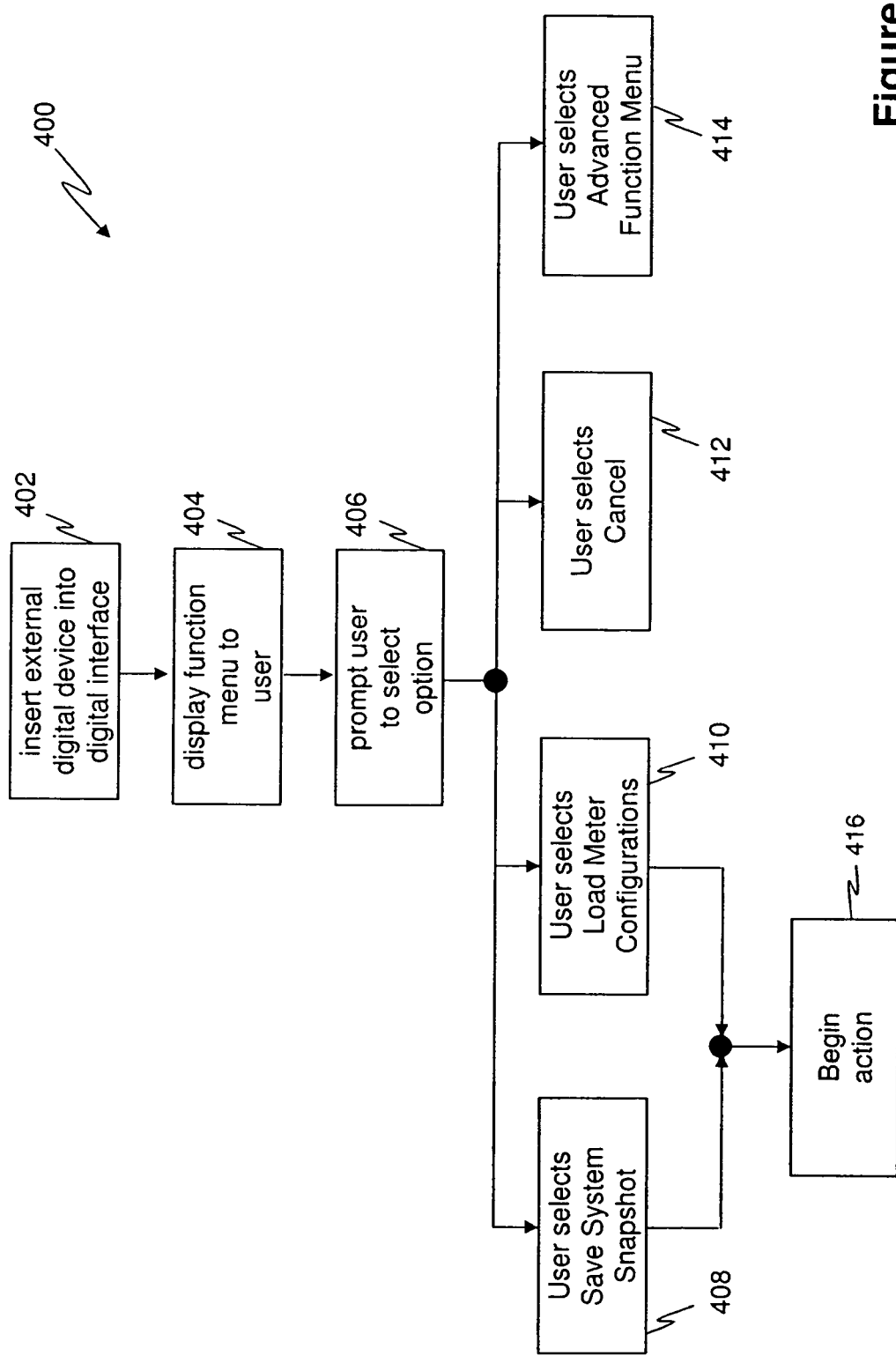
FIG. 4 is a block diagram illustrating the advanced function menu flow for the automatic interface program of FIG. 3.

The second situation involves the situation where the upload/download process is not automatically initiated upon insertion of the USB memory stick 164 into the digital interface 118 but requires input from the user. Referring to FIG. 4, a block diagram 400 illustrating this situation is shown. Upon insertion of the USB memory stick 164 into the digital interface 124, as shown in block 402, a function menu is displayed to the user via the display device 118, as shown in block 404. This function menu displays several options to the user and prompts the user to select one of the options, as shown in block 406, wherein the options include saving a system snapshot, loading meter configurations, accessing an advanced function menu and canceling the current action. If the user selects the option of saving a system snapshot, as shown in block 408, then the user will be prompted to begin the action as shown in block 416. Upon the user selecting the prompt, data responsive to the state of the apparatus 100 for a predetermined period of time will be downloaded and saved to the USB memory stick 164. This data includes raw data directly from the sensor for a predetermined amount of time (i.e. last 5 minutes), system information data (i.e. version of meter firmware and/or software), system configuration data (i.e. initialization file) and meter data for a predetermined amount of time (i.e. last 24 hours). It should be appreciated that meter data includes the sensor data that has been processed by the processing device 110, such as fluid Speed of Sound data, velocity data (i.e. convective velocity of the pressure fields created by the fluid flow), Volumetric Flow rate data, Fluid Flow rate data and Gas Volume Fraction data.

Figure 5:
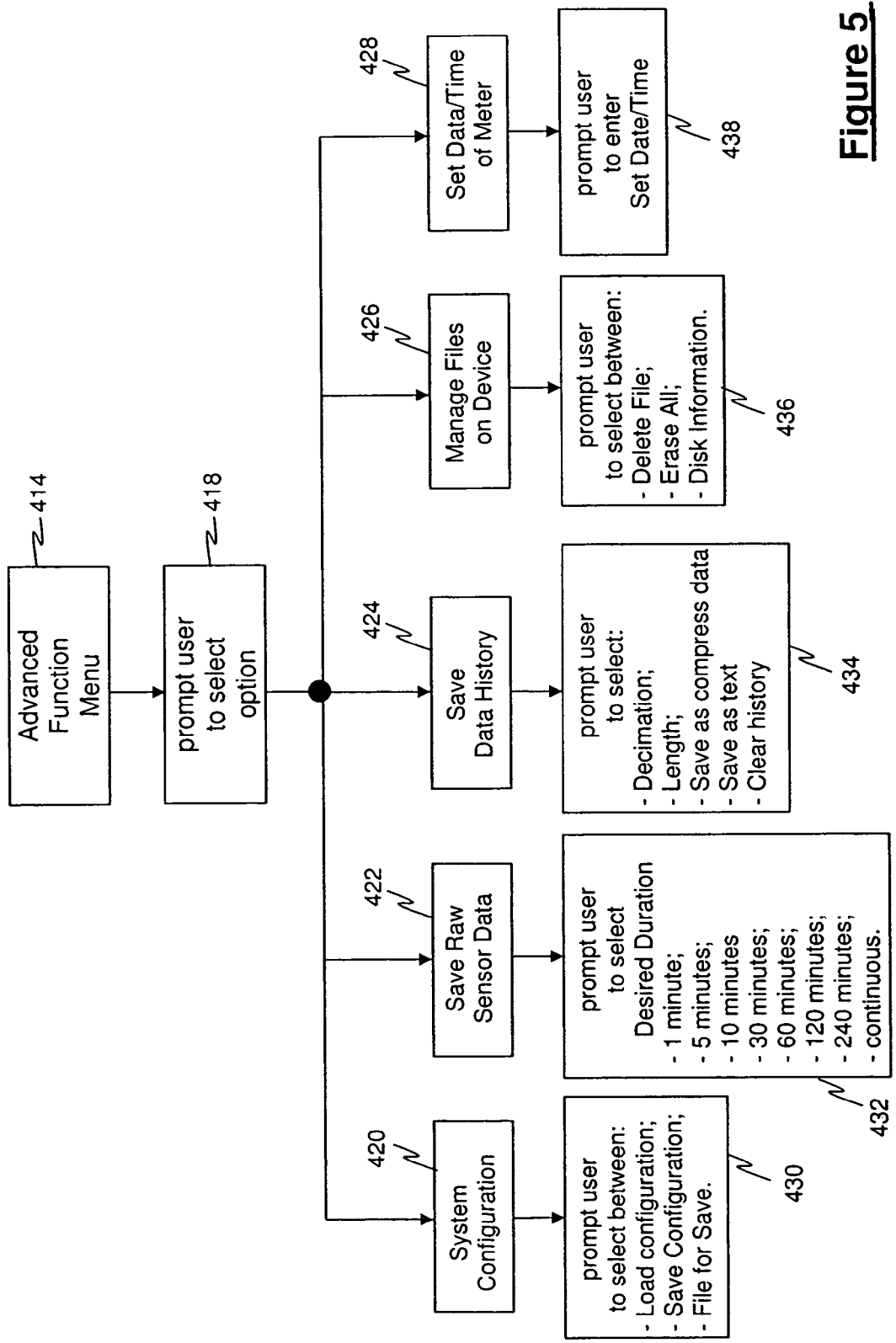
FIG. 5 is a block diagram illustrating the advanced function menu flow for the automatic interface program of FIG. 3.

If the user selects the option of loading meter configurations, as shown in block 410, then the user will be prompted to begin loading new meter configuration data, such as a new initialization file and/or a software upgrade, from the USB memory stick 164 to the apparatus 100, as shown in block 416. Upon the user selecting the prompt, the new meter configuration data will be uploaded and saved to the apparatus 100. If the user selects the cancel option, as shown in block 412, then the display device 118 of the apparatus 100 returns to its normal state and the user has to reinsert the USB memory stick 164 to reactivate the function menu. However, referring to FIG. 5, if the user selects the option of accessing the advanced function menu, as shown in block 414, then the user is prompted to select between several advanced menu options, as shown in block 418, wherein the options include accessing the system configuration, saving raw sensor data, saving data history, managing files on the apparatus 100, and setting the date and time of the apparatus 100.

If the user selects the option of accessing the system configuration of the apparatus 100, as shown in block 420, the user will be prompted to select between several options, as shown in block 430. The first option includes loading a new configuration file from the USB memory stick 164 into the apparatus 100. In this case, if several configuration files are available, then a list of the available configuration files will be displayed to the user for selection. The second option includes saving the current configuration file to the USB memory stick 164 and the third option includes renaming and saving the current configuration file to a different location. It should be appreciated that the name of the configuration file may include meter identification information appended by file type information. For example, a system configuration file from meter number 1 may be saved as "0001_Config." As such, information (data/software) for multiple meters may be uploaded/downloaded and uniquely identified for a specific meter and/or a specific type of meter.

If the user selects the option of saving raw sensor data from the apparatus 100, as shown in block 422, the user will be prompted to select the period of duration of sensor data desired, as shown in block 432. For example, the user may select to save raw sensor data for the previous 1 minute, 5 minutes, 10 minutes, 30 minutes, 60 minutes, 120 minutes and 240 minutes. Additionally, the user may also select an option to save data in a continuous fashion by saving raw sensor data until the memory of the USB memory stick 164 is full. It should be appreciated that if the user fails to select a displayed duration length, then a predetermined default duration length may be used for obtaining the raw sensor data. If the user selects the option to save the data history, as shown in block 424, the user will be prompted to select the decimation (i.e. sample rate) of the data being saved and the length or period of time of the data sample being saved, as shown in block 434. Additionally, the user will be prompted as to whether the data should be saved as compressed data or text data and whether the data history should be erased entirely from the apparatus 100. Upon selecting the decimation of the data being saved, the user will be given a plurality of sampling rate options, such as a sample rate of 2 (i.e. for every two measurements taken, one measurement is saved), 10, 100, 500 and ALL (i.e. every measurement is saved). Moreover, upon selecting the length of time over which the sample should be obtained, the user will be given a plurality of length options, such as for the previous 1 day (i.e. save the data obtained over a period of 24 hours), 5 days, 30 days, 100 days and 500 days. If the user fails to select a displayed decimation rate and/or a period of time over which the data sample should be taken, then predetermined default rates may be used.

If the user selects the option of managing files on the apparatus 100, as shown in block 426, the user will be prompted to select between the options of deleting a file, erasing all files on the apparatus 100 and obtaining disk information, as shown in block 436. If the user elects to delete a particular file, a list of files on the apparatus 100 will be displayed to the user and the user may select one or more files for deletion. If the user elects to obtain and save disk information, the information pertaining to the disk will be saved and may include total disk size, used disk space, free disk space, files located on the disk, date/time of creation of any files located on the disk, date/time of modification of any files located on the disk and date/time the user selected to save the disk information. If the user selects the option of setting the date and/or time on the apparatus 100, as shown in block 428, the user will be prompted to enter the desired date and/or time changes to the apparatus 100, as shown in block 438.

It should be appreciated that the ability to easily access and change/modify the apparatus 100 with the use of a USB memory stick 164 provides for a more robust apparatus 100 by allowing the apparatus 100 to be modified with upgraded meter software for enhanced performance and to change and/or include added functionality (i.e. a flow meter and a GVF meter combination).

Flow Logic

Velocity Processing

Figure 6:
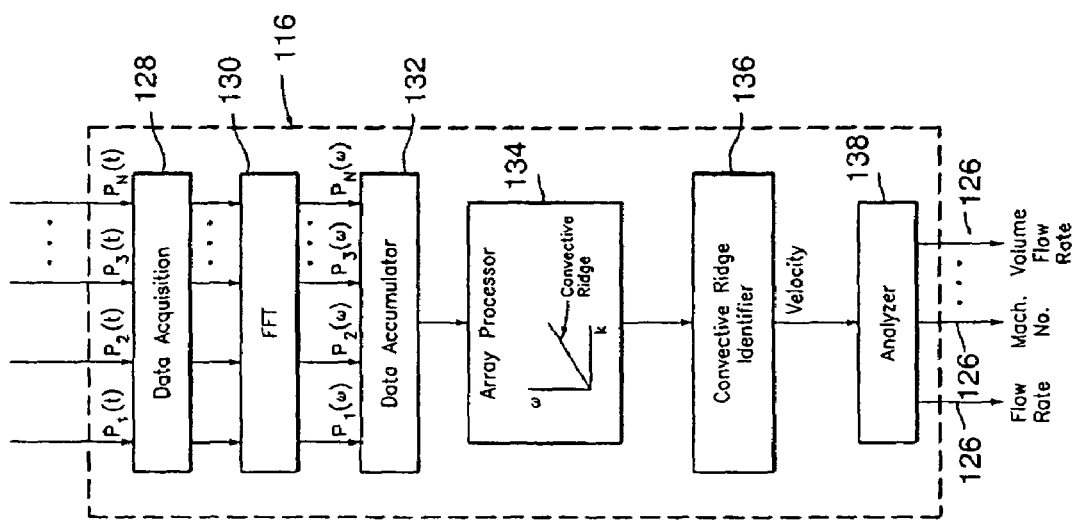
FIG. 6 is a block diagram of a first embodiment of a flow logic used in the apparatus of the present invention.
Figure 7:
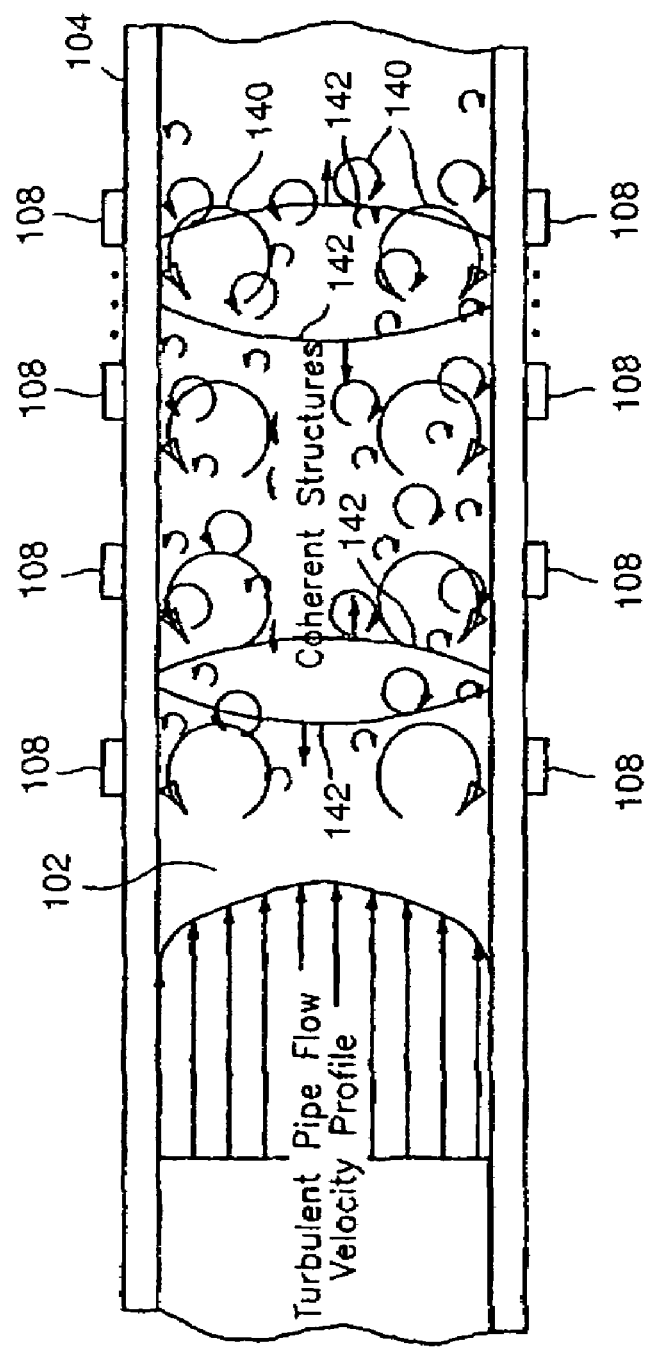
FIG. 7 is a cross-sectional view of a pipe having coherent structures therein.

Referring to FIG. 6, an example of flow logic 116 is shown. As previously described, the array 106 of at least two sensors 108 located at two locations $x_1$, $x_2$ axially along the pipe 104 sense respective stochastic signals propagating between the sensors 108 within the pipe 104 at their respective locations. Each sensor 108 provides a signal indicating an unsteady pressure at the location of each sensor 108, at each instant in a series of sampling instants. One will appreciate that the array 106 may include more than two sensors 108 distributed at locations $x_1 \ldots x_N$. The pressure generated by the convective pressure disturbances (e.g., eddies 140, see FIG. 7) may be measured through strained-based sensors 108 and/or pressure sensors 108. The sensors 108 provide analog pressure time-varying signals $P_1(t), P_2(t), P_3(t) \ldots P_N(t)$ to the signal processor 110, which in turn applies selected ones of these signals $P_1(t), P_2(t), P_3(t), \ldots P_N(t)$ to the flow logic 116.

The flow logic 116 processes the selected signals $P_1(t), P_2(t), P_3(t), \ldots P_N(t)$ to first provide output signals (parameters) 126 indicative of the pressure disturbances that convect with the fluid (process flow) 102, and subsequently, provide output signals (parameters) 126 in response to pressure disturbances generated by convective waves propagating through the fluid 102, such as velocity, Mach number and volumetric flow rate of the process flow 102.

The signal processor 110 includes data acquisition unit 128 (e.g., A/D converter) that converts the analog signals $P_1(t) \ldots P_N(t)$ to respective digital signals and provides the digital signals $P_1(t) \ldots P_N(t)$ to FFT logic 130. The FFT logic 130 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

One technique of determining the convection velocity of the turbulent eddies 140 within the process flow 102 is by characterizing a convective ridge of the resulting unsteady pressures using an array of sensors 108 or other beam forming techniques, similar to that described in U.S. Pat. No. 6,691,584, filed on Jul. 2, 1999 and U.S. Pat. No. 6,609,069, filed on Dec. 4, 2000, which are incorporated herein by reference.

A data accumulator 132 accumulates the frequency signals $P_1(\omega)$-$P_N(\omega)$ over a sampling interval, and provides the data to an array processor 134, which performs a spatial-temporal (two-dimensional) transform of the sensor data, from the xt domain to the k-ω domain, and then calculates the power in the k-ω plane, as represented by a k-ω plot.

The array processor 134 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array 106 into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors 108, and the present invention is not restricted to any particular algorithm. One particularly adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies 140, but rather a continuum of possibly overlapping events forming a temporally stationary, essentially white process over the frequency range of interest. In other words, the convective eddies 140 is distributed over a range of length scales and hence temporal frequencies.

To calculate the power in the k-ω plane, as represented by a k-ω plot (see FIG. 8) of either the signals, the array processor 134 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 108.

The present invention may use temporal and spatial filtering to precondition the signals to effectively filter out the common mode characteristics Pcommon mode and other long wavelength (compared to the sensor spacing) characteristics in the pipe 104 by differencing adjacent sensors 108 and retaining a substantial portion of the stochastic parameter associated with the flow field and any other short wavelength (compared to the sensor spacing) low frequency stochastic parameters.

Figure 8:
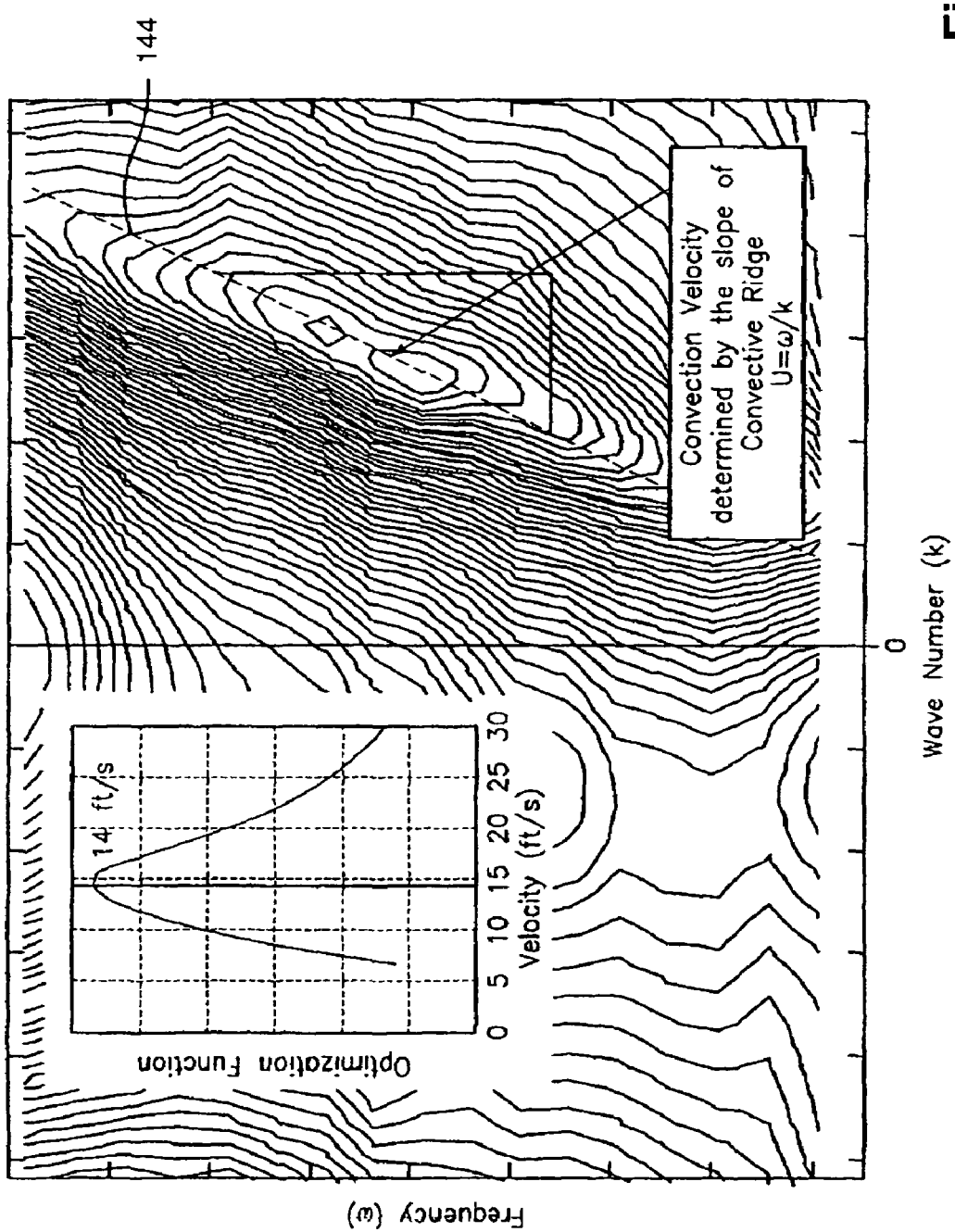
FIG. 8 a k-ω plot of data processed from an apparatus embodying the present invention that illustrates slope of the convective ridge, and a plot of the optimization function of the convective ridge.

In the case of suitable turbulent eddies 140 (see FIG. 7) being present, the power in the k-ω plane shown in a k-ω plot of FIG. 8 shows a convective ridge 144. The convective ridge 144 represents the concentration of a stochastic parameter that convects with the flow and is a mathematical manifestation of the relationship between the spatial variations and temporal variations described above. Such a plot will indicate a tendency for k-ω pairs to appear more or less along a line 144 with some slope, the slope indicating the flow velocity.

Once the power in the k-ω plane is determined, a convective ridge identifier 136 uses one or another feature extraction method to determine the location and orientation (slope) of any convective ridge 144 present in the k-ω plane. In one embodiment, the convective ridge identifier 136 accumulates energy (power) of k-ω pairs in the k-ω plot along different rays emanating from the origin, each different ray being associated with a different trial velocity (in that the slope of a ray is assumed to be the fluid 102 velocity or correlated to the fluid 102 velocity in a known way). The convective ridge identifier 136 may accumulate energy for each array by summing the energy of k-ω pairs along the ray. Alternatively, other methods of accumulating energy along the ray (e.g., averaging) may be used. In any case, accumulated energy is determined for a range of trial velocities between a predetermined minimum velocity and a predetermined maximum velocity. The convective ridge 144 has an orientation that is the slope of the ray having the largest accumulated energy. The convective ridge identifier 136 provides information about the different trial velocities, information referred to generally as convective ridge information.

The analyzer 138 examines the convective ridge information including the convective ridge orientation (slope). Assuming the straight-line dispersion relation given by $k=\omega/u$, the analyzer 138 determines the flow velocity, Mach number and/or volumetric flow, which are output as parameters 126. The volumetric flow is determined by multiplying the cross-sectional area of the inside of the pipe 104 with the velocity of the process 102 flow.

Some or all of the functions within the flow logic 116 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 9:
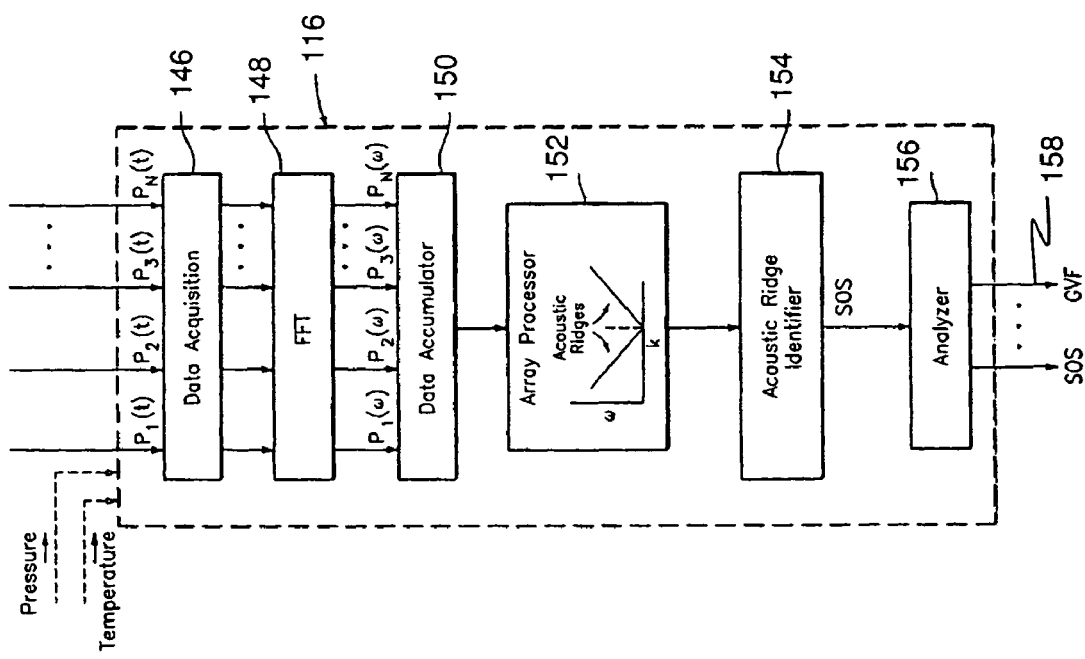
FIG. 9 is a block diagram of a second embodiment of a flow logic used in the apparatus of the present invention.

Referring to FIG. 9, another example of flow logic 116 is shown. While the examples of FIG. 6 and FIG. 9 are shown separately, it is contemplated that the flow logic 116 may perform all of the functions described with reference to FIG. 6 and FIG. 9. As previously described, the array 106 of at least two sensors 108 located at two locations x1, x2 axially along the pipe 104 sense respective stochastic signals propagating between the sensors 108 within the pipe 104 at their respective locations. Each sensor 108 provides a signal indicating an unsteady pressure at the location of each sensor 108, at each instant in a series of sampling instants. One will appreciate that the sensor array 106 may include more than two pressure sensors 108 distributed at locations $x_1 \ldots x_N$. The pressure generated by the acoustic pressure disturbances (e.g., acoustic waves 142, see FIG. 8) may be measured through strained-based sensors and/or pressure sensors. The sensors 108 provide analog pressure time-varying signals $P_1(t), P_2(t), P_3(t), \ldots P_N(t)$ to the flow logic 116. The flow logic 116 processes the signals $P_1(t), P_2(t), P_3(t), \ldots P_N(t)$ from the sensors 108 to first provide output signals indicative of the speed of sound propagating through the fluid (process flow) 102, and subsequently, provide output signals in response to pressure disturbances generated by acoustic waves propagating through the process flow 102, such as velocity, Mach number and volumetric flow rate of the process flow 102.

The signal processor 110 receives the pressure signals from the array 106 of sensors 108. A data acquisition unit 146 digitizes selected ones of the pressure signals $P_1(t) \ldots P_N(t)$ associated with the acoustic waves 142 propagating through the pipe 104. Similarly to the FFT logic 130 of FIG. 6, an FFT logic 148 calculates the Fourier transform of the selected digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals.

A data accumulator 150 accumulates the frequency signals $P_1(\omega) \ldots P_N(\omega)$ over a sampling interval, and provides the data to an array processor 152, which performs a spatial-temporal (two-dimensional) transform of the sensor data, from the xt domain to the k-$\omega$ domain, and then calculates the power in the k-$\omega$ plane, as represented by a k-$\omega$ plot.

To calculate the power in the k-$\omega$ plane, as represented by a k-$\omega$ plot (see FIG. 10) of either the signals or the differenced signals, the array processor 152 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 108.

Figure 10:
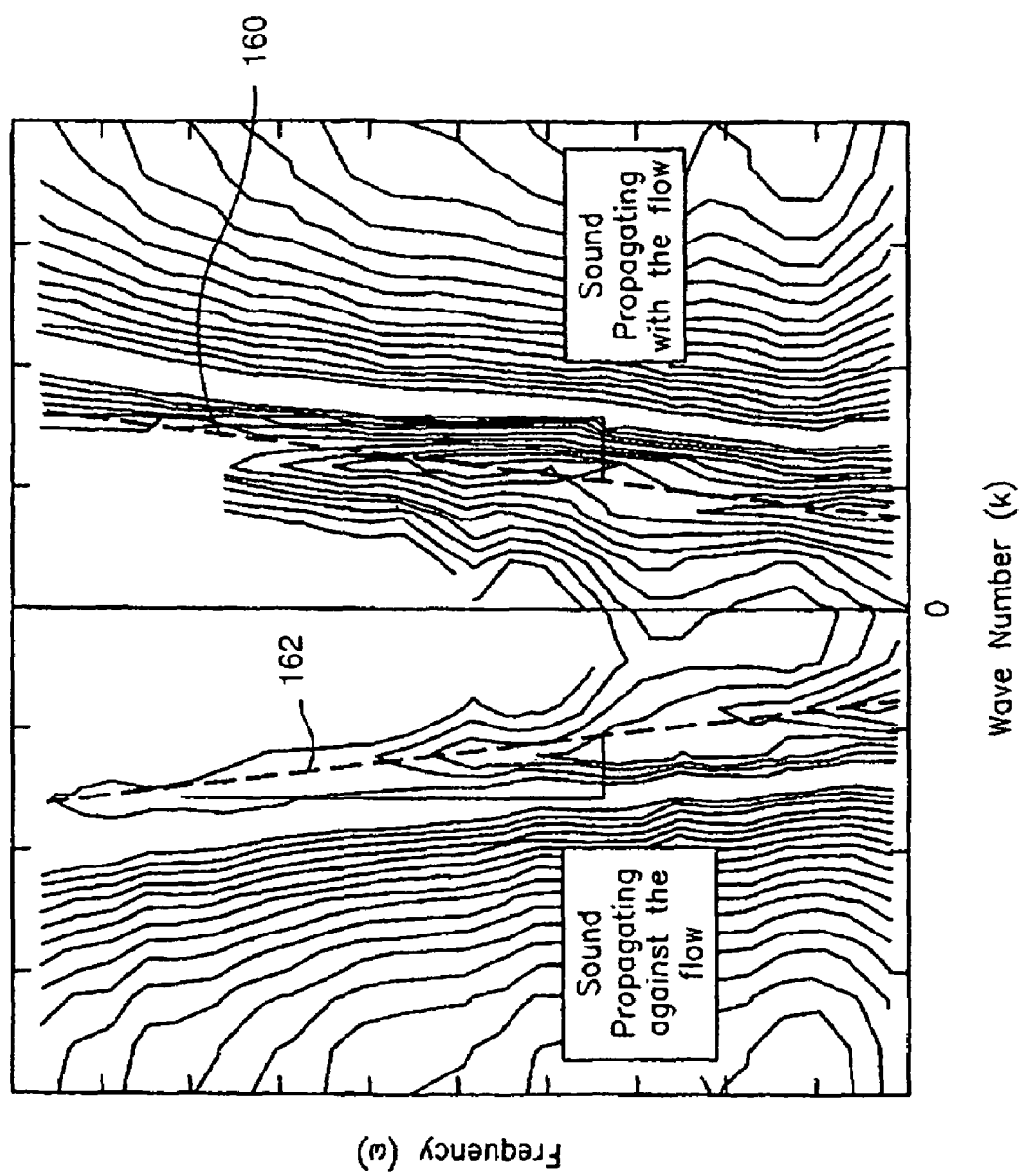
FIG. 10 a k-ω plot of data processed from an apparatus embodying the present invention that illustrates slope of the acoustic ridges.

In the case of suitable acoustic waves 142 being present in both axial directions, the power in the k-$\omega$ plane shown in a k-$\omega$ plot of FIG. 10 so determined will exhibit a structure that is called an acoustic ridge 160, 162 in both the left and right planes of the plot, wherein one of the acoustic ridges 160 is indicative of the speed of sound traveling in one axial direction and the other acoustic ridge 162 being indicative of the speed of sound traveling in the other axial direction. The acoustic ridges 160, 162 represent the concentration of a stochastic parameter that propagates through the flow and is a mathematical manifestation of the relationship between the spatial variations and temporal variations described above. Such a plot will indicate a tendency for k-$\omega$ pairs to appear more or less along a line 160, 162 with some slope, the slope indicating the speed of sound.

The power in the k-$\omega$ plane so determined is then provided to an acoustic ridge identifier 154, which uses one or another feature extraction method to determine the location and orientation (slope) of any acoustic ridge present in the left and/or right k-$\omega$ plane. The velocity may be determined by using the slope of one of the two acoustic ridges 160, 162 or averaging the slopes of the acoustic ridges 160, 162.

Finally, information including the acoustic ridge orientation (slope) is used by an analyzer 156 to determine the flow parameters relating to a measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 134 of FIG. 6, the array processor 152 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array 106 into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 102 is using array processing techniques to define an acoustic ridge 160, 162 in the k-$\omega$ plane as shown in FIG. 10. The slope of the acoustic ridge 160, 162 is indicative of the speed of sound propagating through the process flow 102. The speed of sound (SOS) is determined by applying sonar arraying processing techniques to determine the speed at which the one dimensional acoustic waves propagate past the axial array of unsteady pressure measurements distributed along the pipe 104.

The flow logic 116 of the present embodiment measures the speed of sound (SOS) of one-dimensional sound waves propagating through the process flow 102 to determine the gas volume fraction of the process flow 102. It is known that sound propagates through various mediums at various speeds in such fields as SONAR and RADAR fields. The speed of sound propagating through the pipe 104 and process flow 102 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 106 to measure the speed of sound of an acoustic wave propagating through the mixture 102 is shown and described, one will appreciate that any means for measuring the speed of sound of the acoustic wave may used to determine the entrained gas volume fraction of the mixture/fluid 102 or other characteristics of the flow described hereinbefore.

The analyzer 156 of the flow logic 116 provides output parameters 158 indicative of characteristics of the process flow 102 that are related to the measured speed of sound (SOS) propagating through the process flow 102. For example, to determine the gas volume fraction (or phase fraction), the analyzer 156 assumes a nearly isothermal condition for the process flow 102. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}^2$; Rg=gas density, rl=liquid density, $K_{eff}$=effective K (modulus of the liquid and pipewall), P=pressure, and $a_{meas}$=measured speed of sound.

Effectively, $$\text{Gas Voulume Fraction (GVF)}=(-B+\text{sqrt}(B^2-4*A*C))/(2*A).$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix_\infty}^2} = \sum_{i=1}^{N} \frac{\phi_i}{\rho_i a_i^2}$$

where $$\rho_{mix} = \sum_{i=1}^{N} \rho_i \phi_i$$

One dimensional compression waves propagating within a process flow 102 contained within a pipe 104 exert an unsteady internal pressure loading on the pipe 104. The degree to which the pipe 104 displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity (aeff) for one dimensional compression is given by the following expression:

$$a_{eff} = \frac{1}{\sqrt{\frac{1}{a_{mix_\infty}^2} + \rho_{mix} \frac{2R}{Et}}} \quad \text{(eq 1)}$$

Figure 11:
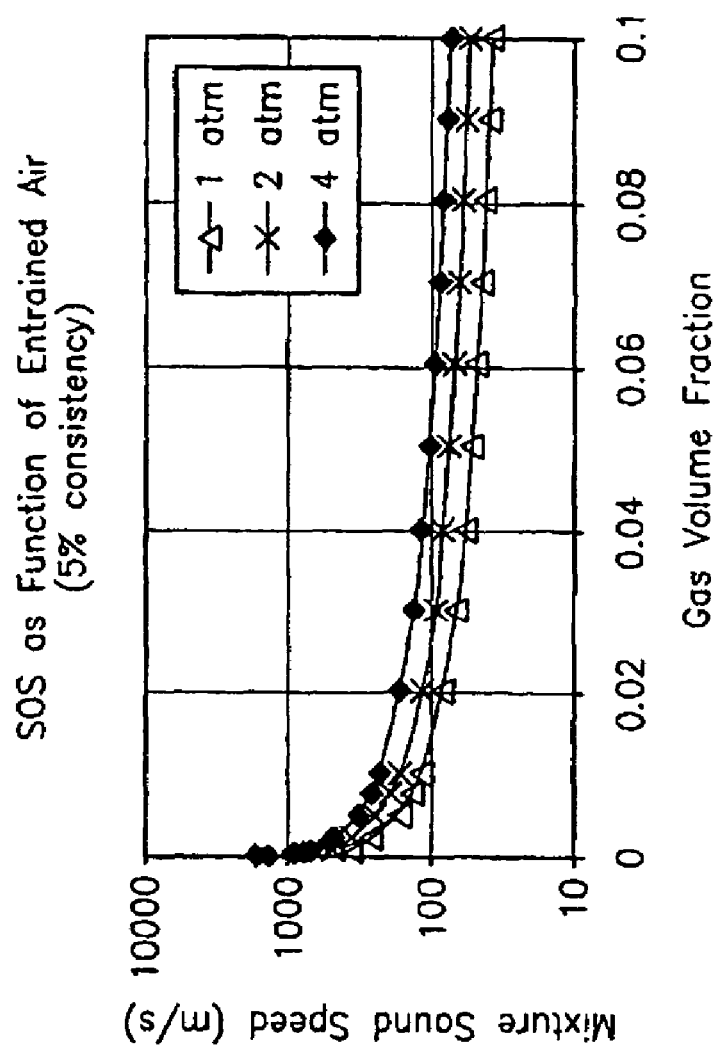
FIG. 11 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 102 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 11.

As described hereinbefore, the flow logic 116 of the present embodiment includes the ability to accurately determine the average particle size of a particle/air or droplet/air mixture within the pipe 104 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 102 will provide a measurement of the average particle size, as well as, the air to particle ratio (particle/fluid ratio) of the process flow 102.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture:

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\rho_p$ is the volumetric phase fraction of the particles in the mixture.

Figure 12:
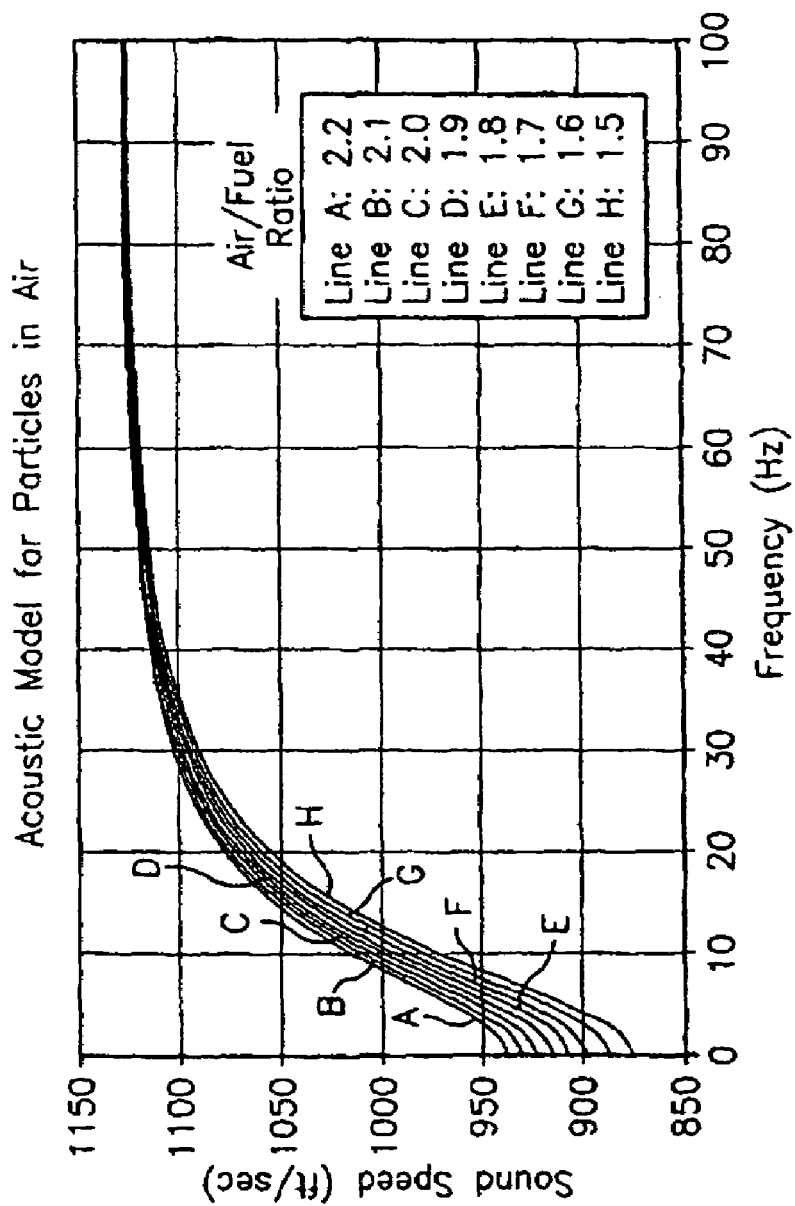
FIG. 12 is a plot of sound speed as a function of frequency for air/particle mixtures with fixed particle size and varying air-to-particle mass ratio.
Figure 13:
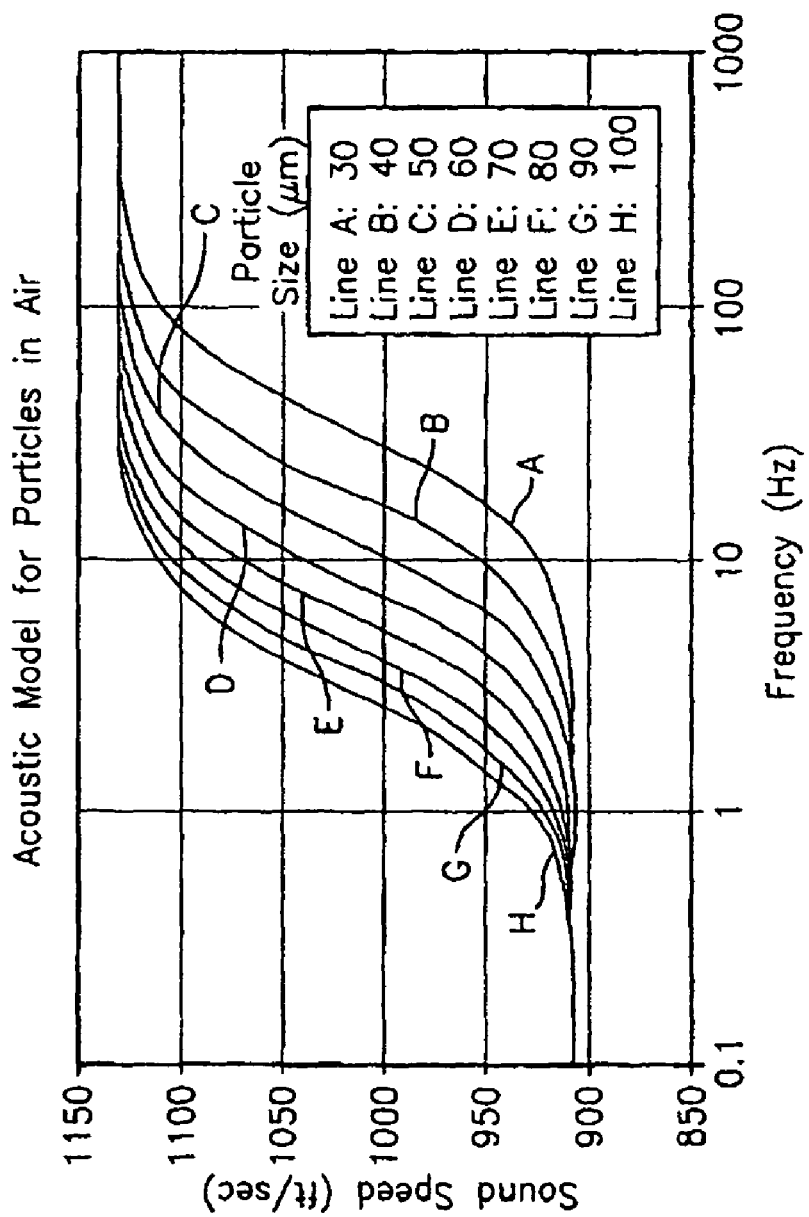
FIG. 13 is a plot of sound speed as a function of frequency for air/particle mixtures with fixed air-to-particle mass ration and fixed particle size.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 12 and FIG. 13 show the dispersive behavior in relations to the speed of sound for coal/air mixtures with parameters typical of those used in pulverized coal deliver systems.

In particular FIG. 12 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 13 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 12 and FIG. 13 illustrate an aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 116 may be implemented in software (using a microprocessor or computer) and/or firmware, or may be implemented using analog and/or digital hardware, having sufficient memory, interfaces, and capacity to perform the functions described herein.

While FIG. 6 and FIG. 9 depict two different embodiments of the flow logic 116 to measure various parameters of the flow process, the present invention contemplates that the functions of these two embodiments may be performed by a single flow logic 116.

The pressure sensors 108 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor 108 and the pipe 104. The sensors 108 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104. If desired, for certain applications, gratings may be detached from (or strain or acoustically isolated from) the pipe 104 if desired. It is also within the scope of the present invention that any other strain sensing technique may be used to measure the variations in strain in the pipe 104, such as highly sensitive piezoelectric, electronic or electric, strain gages attached to or embedded in the pipe 104.

In various embodiments of the present invention, a piezoelectronic pressure transducer may be used as one or more of the pressure sensors and it may measure the unsteady (or dynamic or ac) pressure variations inside the pipe 104 by measuring the pressure levels inside the pipe 104. In one embodiment of the present invention, the sensors 104 comprise pressure sensors 108 manufactured by PCB Piezotronics of Depew, N.Y. For example, in one pressure sensor 108 there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 108 may incorporate a built-in MOSFET microelectronic amplifier to convert the high-impedance charge output into a low-impedance voltage signal. The sensors 108 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors 108 are constructed with either compression mode quartz crystals preloaded in a rigid housing, or unconstrained tourmaline crystals. These designs give the sensors 108 microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 108 may include a piezoelectric sensor that provides a piezoelectric material to measure the unsteady pressures of the fluid 102. The piezoelectric material, such as the polymer, polarized fluoropolymer, PVDF, measures the strain induced within the process pipe 104 due to unsteady pressure variations within the fluid 102. Strain within the pipe 104 is transduced to an output voltage or current by the attached piezoelectric sensors 108.

The PVDF material forming each piezoelectric sensor 108 may be adhered to the outer surface of a steel strap that extends around and clamps onto the outer surface of the pipe 104. The piezoelectric sensing element is typically conformal to allow complete or nearly complete circumferential measurement of induced strain. The sensors 108 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements;
2. Low cost;
3. Measurement technique requires no excitation source. Ambient flow noise is used as a source;
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals; and
5. Higher Temperatures (140C) (co-polymers)

It should be appreciated that the use of a USB memory stick 164 with the digital interface 124 allows for the unique ability to easily access and change/modify the functionality of apparatus 100. For example, because the apparatus may be dependent upon fluid flow characteristics, the apparatus may require customization to function as desired. The use of the USB memory stick 164, allows the apparatus 100 to be customized easily. Additionally, the portability and ease of use of the USB memory stick 164 allows a user to walk between multiple apparatus 100 and download software and/or upload software as desired. This is because the USB memory stick 164 allows for the storage of data wherein the data may be uniquely identifiable by meter and/or date/time. As such, the use of the USB memory stick 164 provides for a more robust apparatus 100 by allowing the apparatus 100 to be modified with upgraded meter software for enhanced performance and to change and/or include added functionality (i.e. a flow meter and a GVF meter combination).

It should be further appreciated that the use of the digital interface 124 with the USB memory stick 164 advantageously allows for easy servicing and/or customizing of the apparatus as required. For example, service on the apparatus 100 may be performed using a variety of different tools depending upon the person (customer, trained distributor, field technician) performing the service. Typically, when there is a service requirement, the person performing the service needs to obtain basic information regarding the state of the apparatus 100 by querying the processing unit 114 via a front panel keypad on the display device 118. Depending upon the information obtained and the level of service to be conducted, more detailed internal systemic parametric information from the processing unit 114 may be required. This may be obtained via the USB memory stick 164 and the data obtained may be uniquely identified by the meter and/or date/time and sent to an external facility (i.e. distributor and/or manufacturer) for further analysis. Using this data, it may then be determined if an issue exists and if so, whether the issue may be fixed remotely or whether a configuration file with appropriate parameter changes can be uploaded to the apparatus 100 via the USB memory stick 164 by the customer/distributor rep or whether a site visit by a trained distributor service technician or manufacturer field technician is required. Alternatively, the user may send the USB memory stick 164 containing the obtained data to the distributor and/or manufacturer for further analysis and diagnosis of the industrial meter offsite. In return, the distributor and/or manufacturer may send the user a USB memory stick 164 having any appropriate software fixes and/or meter settings stored thereon which the user may simply upload to the apparatus 100 to update and/or fix the apparatus 100.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a fluid flowing within a pipe, the apparatus comprising:
    a sensing device having a sensor for sensing a characteristic of the fluid flow, wherein the sensing device generates sensor data responsive to the characteristic;
    a processing device in communication with the sensing device, wherein the processing device is operable to receive and process the sensor data to generate meter data indicative of a first parameter of the fluid; and
    at least one digital interface in communication with the processing device, wherein the at least one digital interface includes an accessible data port configured to receive a portable external digital storage device for transferring information between the apparatus and the portable external digital storage device;
    wherein the processing device is further operable to incorporate the information from the portable external digital storage device, in a manner such that, after the incorporation, the processing device is reprogrammed to generate meter data indicative of a second parameter of the fluid, which second parameter is of a different type than the first parameter.

2. The apparatus of claim 1, wherein said portable external digital storage device is at least one of a Universal Serial Bus (USB) Flash Drive, a Compact Flash card, a Smart Media card, a Secure Digital card and a Multimedia card.

3. The apparatus of claim 2, wherein the information includes at least one of parametric data, configuration data, diagnostic data, functional scripts and meter control information.

4. The apparatus of claim 1, wherein the first and second parameters each comprise one of a Speed of Sound within the fluid, density of the fluid, volumetric flow rate of the fluid, mass fluid flow rate of the fluid, composition of the fluid, consistency of the fluid, size of particles within the fluid, and a gas volume fraction of the fluid.

5. The apparatus of claim 1, further comprising an input device communicating with said processing device including a display device having a user interface for allowing a user to interface with the apparatus.

6. The apparatus of claim 5, wherein said user interface includes an advanced function software menu.

7. The apparatus of claim 6, wherein said advanced function menu includes menu selections to allow a user to select at least one of download information from the apparatus, upload information to the apparatus, to completely change apparatus functionality, to modify apparatus functionality, store raw data for a period of time, store meter data and parameters for a period of time, identify stored data via at least one of a date code and a time code.

8. The apparatus of claim 1, wherein said information is stored on said portable external digital storage device to be associated with a predetermined apparatus.

9. The apparatus of claim 1, wherein said characteristic of the fluid flow includes at least one of acoustic waves and flow disturbances.

10. A method for measuring multiple parameters of a fluid flow within a pipe, the method comprising:
    providing a sensor for sensing the fluid flow within the pipe;
    providing a processing unit with at least one digital interface with an accessible data port, which processing unit is in communication with the sensor to receive and process sensor data from the sensor to generate meter data indicative of a first parameter of the fluid, which parameter is selected from the group of parameters consisting of speed of sound within the fluid, density of the fluid, volumetric flow rate of the fluid, mass flow rate of the fluid, composition of the fluid, consistency of the fluid, size of particles within the fluid, and a gas volume fraction of the fluid;
    providing a portable external digital storage device, independent of the processing unit, that is operable to communicate with the processing device through the accessible data port;

associating the portable external digital storage device with the processing unit via the data port;

transferring information from the external digital storage device to the processing unit via the digital interface; and utilizing the information to change the processing unit from generating meter data indicative of the first parameter of the fluid to a second parameter of the fluid, which second parameter is within the group of parameters and is different from the first parameter;

wherein the information utilized to change the processing unit is software that reprograms the processing unit from generating meter data indicative of the first parameter of the fluid to generating the second parameter of the fluid.

11. The method of claim 10, wherein the portable external digital storage device is at least one of a Universal Serial Bus (USB) Flash Drive, a Compact Flash card, a Smart Media card, a Secure Digital card and a Multimedia card.

* * * * *